United States Patent
Aminabhavi et al.

(10) Patent No.: US 7,544,278 B2
(45) Date of Patent: Jun. 9, 2009

(54) ION EXCHANGE MEMBRANES, METHODS AND PROCESSES FOR PRODUCTION THEREOF AND USES IN SPECIFIC APPLICATIONS

(75) Inventors: Tejraj Aminabhavi, Austin, TX (US); Padmakar V. Kulkarni, Dallas, TX (US); Mahadevappa Y. Kariduraganavar, Dharwad (IN)

(73) Assignee: Seventy-Seventh Meridian Corporation, LLC, Dallas, TX (US)

(*) Notice: Subject to any disclaimer, the term of this patent is extended or adjusted under 35 U.S.C. 154(b) by 933 days.

(21) Appl. No.: 10/827,397

(22) Filed: Apr. 19, 2004

(65) Prior Publication Data
US 2004/0198849 A1    Oct. 7, 2004

Related U.S. Application Data

(62) Division of application No. 10/007,442, filed on Dec. 5, 2001, now Pat. No. 6,814,865.

(51) Int. Cl.
*B01D 61/44* (2006.01)
*B01D 61/42* (2006.01)

(52) U.S. Cl. .............. 204/522; 204/523; 204/524; 204/525; 204/526; 204/527; 204/528; 204/529; 204/530; 204/531; 204/532; 204/533; 204/534; 204/535; 204/536; 204/537; 204/539; 204/540; 204/541; 521/27; 521/28; 521/29; 521/30

(58) Field of Classification Search ........... 521/27–30; 204/522–541
See application file for complete search history.

(56) References Cited

U.S. PATENT DOCUMENTS

| | | | | |
|---|---|---|---|---|
| 2,805,196 | A | * | 9/1957 | Roebersen et al. ......... 204/520 |
| 3,945,927 | A | | 3/1976 | Imai et al. ............... 210/550 M |
| 3,947,351 | A | | 3/1976 | Asawa et al. ............. 210/22 R |
| 4,505,797 | A | | 3/1985 | Hodgdon et al. ......... 204/252 |
| 4,608,393 | A | | 8/1986 | Hamano .................... 521/27 |
| 4,992,176 | A | | 2/1991 | Bartels ..................... 210/640 |
| 5,126,503 | A | | 6/1992 | Bartels ..................... 585/818 |
| 5,137,925 | A | | 8/1992 | Hodgdon .................. 521/27 |

(Continued)

FOREIGN PATENT DOCUMENTS

| | | |
|---|---|---|
| IL | 60843 | 10/1985 |
| JP | 58093729 | 6/1983 |
| JP | 62041234 | 2/1987 |
| JP | 63116708 | 5/1988 |

OTHER PUBLICATIONS

Toti et al., "Electrodialysis Membrane Technology for Purification of Brackish Ground Water," *Polymer News*, 2000, vol. 25, 7 pages.

*Primary Examiner*—Arun S Phasge
(74) *Attorney, Agent, or Firm*—Edwin S. Flores; Daniel J. Chalker; Chalker Flores, LLP

(57) ABSTRACT

The invention includes novel anion exchange membranes formed by in situ polymerization of at least one monomer, polymer or copolymer on a woven support membrane and their methods of formation. The woven support membrane is preferably a woven PVC membrane. The invention also includes novel cation exchange membranes with or without woven support membranes and their methods of formation. The invention encompasses a process for using the membranes in electrodialysis of ionic solutions and in particular industrial effluents or brackish water or seawater. The electrodialysis process need not include a step to remove excess ions prior to electrodialysis and produces less waste by-product and/or by-products which can be recycled.

8 Claims, 7 Drawing Sheets

U.S. PATENT DOCUMENTS

| | | | |
|---|---|---|---|
| 5,152,898 A | 10/1992 | Bartels | 210/640 |
| 5,264,125 A | 11/1993 | MacDonald et al. | 210/500.35 |
| 5,746,917 A | 5/1998 | Altmeier | 210/500.37 |
| 5,936,004 A | 8/1999 | Altmeier | 521/32 |
| 6,045,694 A | 4/2000 | Wang et al. | 210/500.37 |
| 6,103,078 A | 8/2000 | Hitchems et al. | 204/296 |

* cited by examiner

ION EXCHANGE MEMBRANES, METHODS AND PROCESSES FOR PRODUCTION THEREOF AND USES IN SPECIFIC APPLICATIONS

RELATED PATENT APPLICATION

This application is a Divisional Application of U.S. application Ser. No. 10/007,442 entitled "Ion Exchange membranes, Methods and Processes for Production Thereof and Uses in Specific Applications" filed Dec. 5, 2001 now U.S. Pat. No. 6,814,865.

BACKGROUND OF THE INVENTION

The present invention relates to a new family of anion and cation exhange membranes, methods of producing such membrances, and their uses.

Uses of Ion Exchange Membranes

Anion exchange membranes having anion exchange groups such as quaternary ammonium groups or cation exchange membranes having cation exchange groups such as sulfonic acid groups or carboxylic acid groups have a wide variety of applications including desalination, precious metal recovery, etc. Such ion exchange membranes are critical components of advanced separation systems that may be used in:

electrodialytic concentration or desalination of electrolyte solutions,
separation of specific ions from mixture of ionic solutions,
processes such as chlor-alkali production, where the membranes are used as separators for electrolysis,
recovery of acids or alkalis through ion exchange membrane processes,
concentration of seawater to produce sodium chloride,
deminerlization of saline water, and
desalination of cheese-whey products.

In a more specific illustration, the excessive use of fertilizers has resulted in the excessive concentration of nitrate ions in ground water. This poses a serious problem because concentrations of nitrate ions above 25 ppm are harmful to human health. Similarly, concentrations of fluoride ions significantly above the 0.5-1.5 ppm recommended level for drinking water are harmful to human health. Excessive fluoride intake may result in skeletal or dental fluorosis.

Recent studies have clearly shown a direct correlation between the intake of nitrate and blue baby syndrome (resulting in infant mortality), cancer of the womb and other problems in pregnant women. Excessive chloride has also caused panic where young and capable people have suddenly developed premature aging symptoms requiring walking sticks to move. Such health threats may be alleviated by removing excessive harmful ions from water using an anion exchange membrane in appropriate combination with a cation exchange membrane.

The use of these anion and cation exchange membranes represents an advancement over the techniques used in the past, such as reverse osmosis and ultrafiltration (*Desalination*, 121: 139 (1999)). More stringent regulations designed to promote public health also make the removal of these and harmful ions necessary for a wide range of industrial applications. Electrodialysis represents the most promising method to meet these regulatory requirements through the development of nitrate and fluoride ion-selective anion exchange membranes.

In fact, for treatment of a variety of industrial effluents, elctrodialysis offers significant advantages over other techniques (*Pure and Applied Chemistry*, 46 213-220 (1976)). One such advantage lies in the fact that wastewater constituents are neither destroyed nor chemically altered by electrodialysis. This allows the recovery of valuable products such as certain metal ions and other inorganic materials which may then have further commercial applications. Such recovery is facilitated by the fact that electrodialysis produces a concentrated, low-volume waste stream containing these products. Further, this results in high ratios of recovered water. Water retrieved through electrodialysis is relatively clean and may be used or reused with little or no further treatment. Electrodialysis processes using ion exchange membranes also represent an advantage over the currently used reverse osmosis methods for recovery of precious metals such as gold and silver because reverese osmosis membranes are susceptible to scaling and salt deposition, known as membrane fouling. Electrodialysis membranes can easily be washed with dilute acidic solutions requiring minimum maintainance and also minimum waste is generated during the process.

Another advantage lies in the properties of the membranes themselves. Electrodialysis membranes may be synthesized to be highly specific, allowing the separation of targeted ions in the electrodialysis process. Ion exchange membranes are also capable of withstanding highly acidic solutions, unlike membranes and materials used in other filtration processes. If they are durable and specific, ion exchange membranes may be cost effective even in small-scale treatment. However, these membranes remain most useful in removing salts from water, seawater, brackish water, including valuable metals from waste industrial sources because utilizing such membranes with large contact areas further reduces the cost of the process.

Current Techniques for Producing Ion Exchange Membranes

Despite the great potential of ion exchange membrane electrodialysis applications, current techniques for producing such membranes are inadequate or overly expensive. Most of the previously developed ion exchange membranes may be classified as either homogenous or heterogenous. Heterogenous membranes are prepared by incorporating the ion exchange groups into the film-forming resins by (i) dry molding or calendering mixtures of the ion exchange and film-forming materials, (ii) dispersing the ion exchange material in a solution of the film-forming polymer and then casting films from the solution and evaporating the solvent, and (iii) dispersing the ion exchange material in a partially polymerized film-forming polymer, casting films, and completing the polymerization. FIG. 1 illustrates a current heterogenouse membrane as described in U.S. Pat. No. 6,103,078 of Hitchems et al.

Homogenous ion exchange membranes are better suited because the fixed ion charges are distributed homogenously over the entire polymer matrix. In the past, a few homogenous ion exchange membranes have been prepared by (i) polymerization of mixtures of reactants that can undergo condensation polymerization (at least one of the reactants must contain a group that can be made anionic or cationic) or (ii) chain polymerization of mixtures of reactants (e.g. styrene, vinyl pyridine or divinylbenzene) that can polymerize (at least one of the reactants must contain an anionic or cationic moiety). There is a current need for the development of ion exchange membranes possessing a combination of both good electrochemical performance and high mechanical strength that can be provided by the homogenous membranes.

More specifically, previously developed heterogenous ion exchange membranes are prepared by dispersing finely divided pulverized particles of ion exchange materials in a polymeric binder. These membranes suffer from numerous disadvantages arising from their macro-sized, non-uniform particle structure. Furthermore, it is extremely difficult to overcome this problem by uniformly dispersing the ion exchange materials in the polymer binder. Because of the persistence of this problem, membranes prepared in this manner will contain zones with higher or lower concentration of the exchangeable ionic groups, leading to inequalities in ion transport. This in turn results in interuptions in ionic conductance from one side of the membrane to the other when employed in electrodialysis.

One type of heterogenous membrane, the composite membrane, attempts to overcome these problems by using thin adhesive layers for lamination of the cation or anion exchange membranes. See FIG. 1. Although this type of membrane is quite popular and exhibits tolerable stability in some processes, it is entirely unsatisfactory in harsh environments such as those with high temperatures and strong oxidizing conditions. In these harsh environments, the thin adhesive layer used to laminate the membrane is not stable and will peel off after extened use, destroying the membrane.

Homogenous membranes have generally been prepared by casting homogenous solutions of a film-forming polymer or copolymer (e.g. polystyrene-butadiene) and a polyelectrolyte (e.g. N-methyl-4-vinyl pyridinium chloride polymer). Although generally better than heterogenous membranes, even these membranes are unsatisfactory for a wide variety of applications because the mixed polyelectrolyte is not bound to the film-forming polymer. As a result, the polyelectrolyte is slowly extracted from the membrane during use, eventually resulting in a loss of conductivity as well as ion exchange capacity.

Some of the more successful ion exchange membranes have employed a wide range of support materials. Specifically, polyester (Dacron®), polyamides (Nylon®), acrylics (Orlon®), modacrylics (Dynel® or Kanecaron®), vinylidene chlorides (Saran®), tetrafluoroethylene (Teflon®), glass (Fiberglas®), rayons, polyvinyl chloride (Teviron cloth), polypropylene and the like having a visibly open structure as found in woven type fabrics have been used.

Radiation-induced grafting methods previously described and widely investigated for the preparation of ion exchange membranes have met with limited success. When practiced on a large scale, however, the levels of electrical power required to produce these membranes is economically or physically impracticable (*J. Applied Polymer Sci.*, 76: 220-227 (2000), *J. Electrochemical Society*, 142: 3659-3663 (1995), *J. Applied Polymer Sci.*, 64: 1469-1475 (1997)). To date, most of the commercially available ion exchange membranes are prepared using the copolymers of styrene (St), chloromethylstyrene and divinylbenzene (DVB), which are subsequently modified by the addition of ion exchange moieties (*Reactive & Functional Polymers*, 46: 39-47 (2000)). Since St-DVB copolymer is not easily molded into a membrane of sufficient mechanical strength for most applications, St, DVB and other monomers are often alternatively coated onto a support membrane made of polypropylene (PP) or polyvinyl chloride (PVC). Apart from styrene, polysulfones, polyether sulfones or polyvinylpyridine have also been used as a matrix polymer. However, these materials are all difficult to shape into thin, flexible layers most useful as ion exchange membranes. In addition, very toxic chemicals such as chloromethyl ethers (a carcinogenic compound) must be used to produce these polymers.

Anion exchangers (e.g. DD 301 541) (*J. Membrane Science*, 179: 101-117 (2000)) containing alkylidene epoxides bound on a polyvinyl alcohol base and prepared from the reaction of epichlorohydrin with the secondary or teriary amines have also been produced. These exchangers have the drawback that they can only be produced as balls and not as membranes. Additionally, their chemical stabiliity against acids and alkalis is unsatisfactory due to the production of polyhydroxylated polymers.

Presently, most successful anion exchange membranes have been prepared by copolymerizing chloromethylstyrene or vinyl pyridine in the presence of divinyl benzene using benzoyl peroxide as an initiator (*J. Membrane Science, Part B*, 37: 1773-1785 (1999)). Membranes have also been prepared by copolymerization of styrene and divinyl benzene or butadiene or copolymerization of acrylonitrile and butadiene. The ionic charges on the membranes were introduced by using quaternary salts like trimethylamine in the case of chloromethylstyrene and methyl iodide or, rarely, methylbromide in the case of vinyl pyridine monomer. These membranes have shown low electrical resistivity and good mechanical strength in addition to satisfactory transport properties i.e. transport numbers exceeding 98% for the corresponding anions such as bromide, nitrate, chloride, fluoride, sulfate, etc.

Even though these membranes have reached commercial applications in electrodialysis, they leave ample room for further improvement. The primary problem with such membranes lies in the method of preparation. The method used to prepare chloromethylstyrene is very hazardous because it necessitates the use of toxic compounds, such as chloromethylether, a known carcinogen which may even become airborn during the preparation process. Moreover, chloromethylstyrene is usually not available in large quantities. Additionally, the use of divinyl benzene makes the preparation process very costly further leading to the increased overall process cost.

In other efforts, polysulfone and polyethersulfone membranes have been prepared (*J. Membrane Science*, 156 61-65 (1999)). These types of membranes show increased mechanical strength and increased facility in the fabrication process. However, membrane synthesis nevertheless requires the use of hazardous chloromethylether. Moreover, these membranes exhibit transport numbers only in the range of 77% to 87% (*J. Membrane Science, Part B*, 37: 1773-1785 (1999)).

A few attempts have been made to synthesize anion exchange membranes by copolymerizing 4-vinylpyridine with divinyl benzene (*Polymer*, 40: 7243-7249 (1999)). Radiation grafting of 4-vinylpyridine onto polyethylene thin film as a support have also been attempted (*J. Polymer Science, Part B:* 27: 2229-2241 (2000); *J. Applied Polymer Science*, 64: 1469-1475 (1997)). The electrochemical properties of these membranes are poor. U.S. Pat. No. 5,936,004 was issued for the preparation of blend membranes of epichlorohydrin and polyacrylonitrile in the presence of 1,4-diazobicyclo-(2,2,2)-octane in DMF as a quaternizing agent. See the chemical structure given in FIG. 2 for an illustration of this membrane. This method avoids the use of toxic chloromethylether and the membranes appear to have better transport properties than previously reported, but they have not been commercially accepted for a variety of reasons. First, the membranes are formed solely from the polymer itself and lack any additional support. Thus their mechanical stability is impaired, especially at larger sizes. Second, the membranes are formed by starting with halogenated polyethers to produce polyethylene-based membranes. Polyethylene is not as strong as many other fibers and this contributes to further deficiencies in mechanical strength. Therefore, the membranes of U.S. Pat. No. 5,936,004 are limited in size and must be replaced frequently because of their poor mechanical stability.

Additionally, such membranes are often unable to process highly concentrated ionic solutions. Therefore, a pretreating process must be used to remove some unwanted ions prior to treatment by electrodialysis. In the case of desalination, this requirement is set forth previously (*Polymer News*, 25: 80-86 (2000)), which describes a desalination technique using state-of-the-art membranes. Because of the inherent limitations of these membranes, and the entire pretreatment system is required prior to electrodialysis, making the process costlier and more cumbersome.

Therefore, a need exists for the development of ion exchange membranes with good electrochemical properties coupled with excellent chemical, mechanical and thermal stability that may be prepared with minimal usage of hazardous chemicals and that may be used in a wide variety of applications and particularly in commercial applications or for concentrated ionic solutions.

SUMMARY OF THE INVENTION

The present invention meets the needs for improved ion exchange membranes and processes for their preparation and use described above and presents other advantages as summarized below.

One membrane of the present invention is a homogenous anion exchange membrane comprising of poly(4-vinylpyridine) crosslinked with epichlorohydrin and aniline on a woven support membrane. In a preferred embodiment, the woven support membrane is a woven PVC membrane (more commonly Teviron cloth).

Another membrane of the present invention is a homogenous cation exchange membrane comprising crosslinked N,N'-diallylaniline and a maleimide derivative on a woven support membrane. The woven support membrane in a preferred embodiment of this membrane is also a woven PVC membrane (Teviron cloth).

In another embodiment, a novel cation exchange membrane was developed by using polyvinyl alcohol, PVA (Mol. Wt.=1,25,000). The process involves the bromination (0.5 N bromine in acetic acid) of PVA followed by sulfonation in 25% aqueous solution of sulfanylic acid for 6 hours. The sulfonated membrane obtained was crosslinked with formaldehyde in concentrated sulfuric acid for 30 minutes to obtain a good cation exchange membrane.

The process of the present invention is for producing an ion exchange membrane through in situ polymerization of at least one monomer, comonomer, polymer or copolymer on a woven support membrane. A thick solution of the monomers, comonomers, polymers and/or copolymers is prepared and polymerization carried on the woven support membrane. Polymerization in situ requires the addition of a catalyst. A polyelectrolyle may be produced during polymerization or subsequent to that step. Additionally, the polymers may be crosslinked during polymerization or subsequent to that step. In a preferred embodiment, the woven support membrane is a woven PVC cloth. Crosslinking may be accomplished through the use of a crosslinking agent or by heat curing. After the membrane has been formed and crosslinked, it may be subjected to a reagent capable of forming an ion exchange group from previously unreacted portions of the monomer, comonomer, polymer and/or copolymer.

In a preferred embodiment, the process is used to form an anion exchange membrane comprising a positively charged organic molecule, a quaternary ammonium group, or another alkaline group. At least one monomer, comonomer, polymer or copolymer is preferably an aromatic nitrogen-containing monomer, polymer and/or copolymer containing one or more tertiary amine groups. These tertiary amine group or groups may be quaternized during or after polymerization to produce a quaternary ammonium anion exchange group. If quaternization is accomplished after polymerization and crosslinking, a quaternizing agent should be used. This quaternizing agent might be methyl chloride, methyl iodide, methyl bromide, ethyl chloride, ethyl iodide, ethyl bromide, propyl chloride, propyl iodide, or propyl bromide. Preferably, it is methyl iodide in a hexane solvent to make the process less toxic.

At least one of the monomers used in anion exchange membrane formation is preferably selected from the group consisting of tertiary substituted acrylamides, methylacrylate esters, methylacrylamides, acrylates, esters and alkyl-substituted tertiary amine groups. In a more preferred embodiment, a polymer or copolymer comprises 4-vinylpyridine, an aromatic monomer, an aliphatic epichlorohydrin monomer, and the crosslinking agent comprises aniline. All these chemicals are nonhazardous. The molar ratio of 4-vinyl pyridine:epichlorohydrin:aniline is preferably 1:1:0.5, 1:0.5:0.25, or 1:1:0.05.

In another preferred embodiment, a copolymer comprises 4-vinylpyridine and another copolymer comprises N-isopropylacrylamide, a monomer comprises an aliphatic epichlorohydrin, the crosslinking agent comprises aniline, and polymerization is initiated using benzyl peroxide.

In another preferred embodiment the process is used to produce a cation exchange membrane comprising a sulfonic acid group. Following polymerization and crosslinking the membrane may be subjected to a sulfonating agent to produce ion exchange groups from previously unreacted polymers. The sulfonating agent is preferably sulfanylic acid in dichloromethane. In a more preferred embodiment, one copolymer is N,N'-diallylaniline and another copolymer is a maleimide derivative. In another preferred embodiment, the polymer is a brominated polyvinyl alcohol.

The invention also comprises a process for electrodialysis using the membranes. The process generally comprises providing a solution comprising ions to be removed, passing the solution through a membrane stack of alternating anion and cation exchange membranes while applying a current orthogonal to the membrane surfaces, and withdrawing purified or concentrated solution from alternating compartments of the membrane stack. The process may be used to treat industrial effluents, especially aqueous industrial effluents. It may also be used to treat naturally occurring aqueous solutions such as brackish water or seawater. The desired end product of treatment may be purified water and/or recovered ions. Except in the case of extremely concentrated solutions, there is no need to remove excess ions prior to electrodialysis. Finally, membranes may be constructed so as to be selective in ion permeability to allow removal of primarily one or more particular types of ions.

For a better understanding of the invention and its advantages, reference may be made to the following description of exemplary embodiments, taken in conjunction with the accompanying drawings

BRIEF DESCRIPTION OF THE DRAWINGS

FIG. 1 depicts a heterogenous membrane of the type described in U.S. Pat. No. 6,103,078.

FIG. 2 depicts a homogenous membrane of the type described in U.S. Pat. No. 5,936,004.

FIG. 3 is an anion exchange membrane of the present invention.

FIG. 4 is a cation exchange membrane of the present invention.

FIG. 5 is another cation exchange membrane of the present invention.

FIG. 6 is a preferred embodiment of the process for producing anion exchange membranes.

FIG. 7 is another preferred embodiment of the process for producing anion exchange membranes.

FIG. 8 is a preferred embodiment of the process for producing cation exchange membranes.

FIG. 9 is another preferred embodiment of the process for producing cation exchange membranes.

FIG. 10 depicts the electrodialysis step of a preferred embodiment of the desalination process of the present invention.

DETAILED DESCRIPTION OF THE INVENTION

Figure 1:
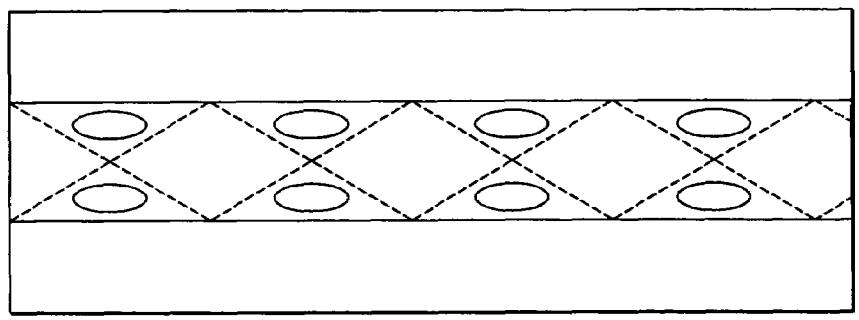
FIG. 1.
Figure 2:
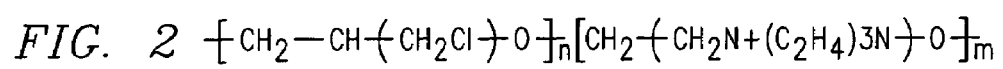
FIG. 2.

This invention relates to the development of new polymeric membranes for the separation of inorganic salts from their mixtures. The membranes may also be used for the permeation of dissolved oxygen from water. The ion exchange membranes of this invention have good electrochemical properties and excellent chemical, mechanical and thermal stability and can be used for the effective removal of salts from water from any source. These membranes are useful for the removal of cations and anions of any salts in water including fluoride, chloride, nitrate, phosphate, and sulfate. The membranes can be designed to possess high salt selectivity and exhibit good electrical conductivity. The methods used to produce these membranes are quite simple and less expensive than the present ion exchange membrane production methods and thus contribute to the overall economy of any process using these membranes. The invention also encompasses the use of these membranes in a variety of electrodialysis applications from desalination techniques for the recovery of heavy metals or even cyanide ions from waste streams from the metal plating and mining industries.

The anion exchange membranes of the present invention include the positively charged organic molecules, quaternary ammonium groups, or other alkaline groups. The cation exchange membranes include sulfonic acid groups, carboxylic acid groups, or other acidic groups. The membranes produced show good mechanical and chemical stability coupled with excellent electrochemical properties, including low AC electrical resistance resulting in greater conductivity. The membranes may be reinforced on a woven PVC cloth to provide further mechanical support and stability.

The conditions used in the present invention to produce ion exchange membranes are completely non-hazardous and do not require sophisticated equipment or facilities in comparison with the methodologies presently used. The cost of membrane production is considerably less and the manufacturing process is environmentally cleaner when compared with many available technologies.

Electrodialysis units using these membranes are easy to operate, require less expensive maintenance, and consume less electricity when compared to units using conventional membranes. Further, the membranes may be used in a wide variety of electrodialysis application including, but not limited to:

- removal of any salts, cations, or anions including, but not limited to, nitrates, sulfates, phosphates, chlorides, bromides and fluorides from any sources including ground water, brackish ground water, surface water, brackish surface water, sea water and industrial waste water to produce potable or other less ionized water;
- concentration and recovery of salts and metals from industrial and mining effluents, and other sources of raw materials, including the production of salt from seawater;
- removal of ionic salts from waste water from any industial process including chemical, food preparation, pharmaceutical, petroleum, metallurgical and synfuel-related processes to produce water suitable for reuse or discharge;
- concentration and removal of various acids such as hydrochloric acid, phosphoric acid, sulfuric acid, chromic acid and hydrofluoric acid from industrial effluents and any other sources of these and other acids
- separation of metallic and nonmetallic elements including iodine, strontium, uranium, and plutonium, whether radioactive or non-radioactive, from nuclear waste sources as needed in nuclear waste processing, recycling and disposal during dismantling of nuclear weapons, or design and operation of nuclear power plants and in other facilities;
- purification of water for reuse in industrial applications including electroplating, leather tanning, dying, semiconductor manufacture, printed circuit board manufacture and mining;
- deashing of sugar cane juice for production of better quality sugar and improved yield with reduced generation of molasses;
- purification of amino acids, vitamins, enzymes, cheese and vaccines; and
- removal of excessive fluoride and arsenic from ground water.

Ion Exchange Membranes

The ion exchange membranes of the present invention are homogenous membranes composed of polymer and polyelectrolyte polymerized in situ and crosslinked. Ion exchange groups may be present immediately after polymerization in situ or may be formed by subsequent treatment of the membrane.

One of the most desirable qualities of ion exhange membranes is the ability to reduce the consumption of electric power by incorporation of materials with low electrical resistance. Lower electrical resistance results in faster permeability of ions through the membrane when used in electrodialysis (*J. Membrane Science,* 181: 167-178 (2001); *J. Membrane Science,* 179: 101-117 (2000)). The membranes of the present invention exhibit relatively low electrical resistance. For example, one anion exchange membrane was found to have a resistance of only 1.5 to 3.0 ohm $cm^2$ when equilibrated at room temperature in a salt solution, a value that is most satisfactory even when compared to the presently used membranes.

In addition to low electrical resistance, ion exchange membranes require mechanical strength to withstand the physical forces of electrodialysis. Many previous membranes have either exhibited poor mechanical strength or have obtained it at the expense of desirable electrochemical properties. Crosslinking of the present membrane improves its mechanical stability with little to no detriment to electrochemical properties. Mechanical strength is further increased by the support membrane upon which the ion exchange membrane is polymerized. The support membrane is chosen so that it is neither soluble nor subject to substantial swelling in the solvent or medium in which the polymer is found prior to in situ polymerization. In a preferred embodiment of the present invention, PVC fabric (Teviron cloth, Teijin Co., Ltd., Minoamihonmachi, Chuuou-ku, Osaka city, Japan) is used as a support membrane. PVC is the preferred material because it can form a microporous structure and is resistant to a wide variety of chemicals.

Figure 3:
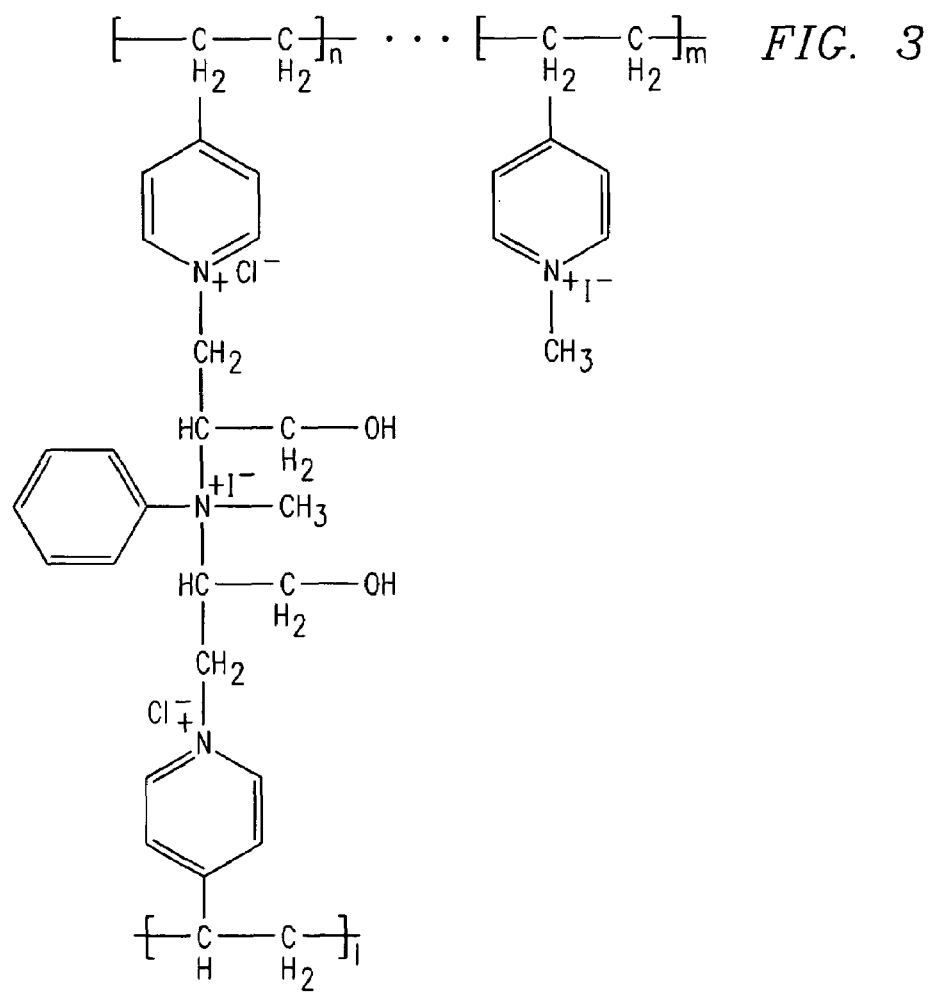
FIG. 3.

One anion exchange membrane of the present invention may be produced by the polymerization of an aromatic nitrogen-containing monomer, polymer, and/or copolymer containing one to several tertiary amine groups which is contemporaneously or subsequently quaternized. The quaternary ammonium anion exchange group formed by direct addition thus creates a polymeric quaternary ammonium chloride. The membrane may also be crosslinked via polymerization of its vinyl group in the presence of epichlorohydrin and aniline using a catalyst under heat treatment. The crosslinking step helps to restrict water imbibition when water is taken up or absorbed by the ion exchange membrane. Membrane formation occurs in situ after application to a woven support membrane, preferrably a PVC support membrane. See FIG. 3 for an illustration of one such membrane.

Figure 4:
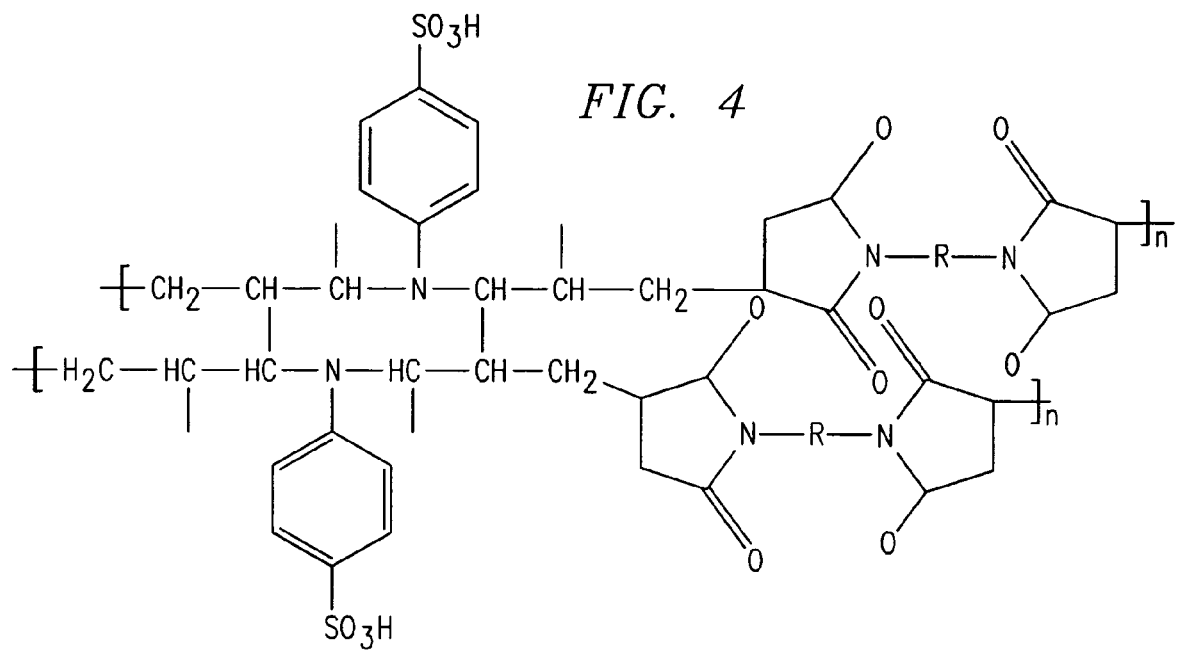
FIG. 4.

Similarly, a cation exchange membrane of the present invention may be prepared by copolymerization of N,N'-diallylaniline with a maleimide derivative and then applied as a paste to a woven PVC support for in situ polymerization. The polymer thus formed is further crosslinked by thermal curing in order to increase the mechanical strength and chemical stability. The membrane is then subjected to sulfonation using chlorosulfonic acid in dichloromethane. This results in a high level of acidic groups dispersed throughout the membrane. Such a cation exchange membrane is illustrated in FIG. 4.

Figure 5:
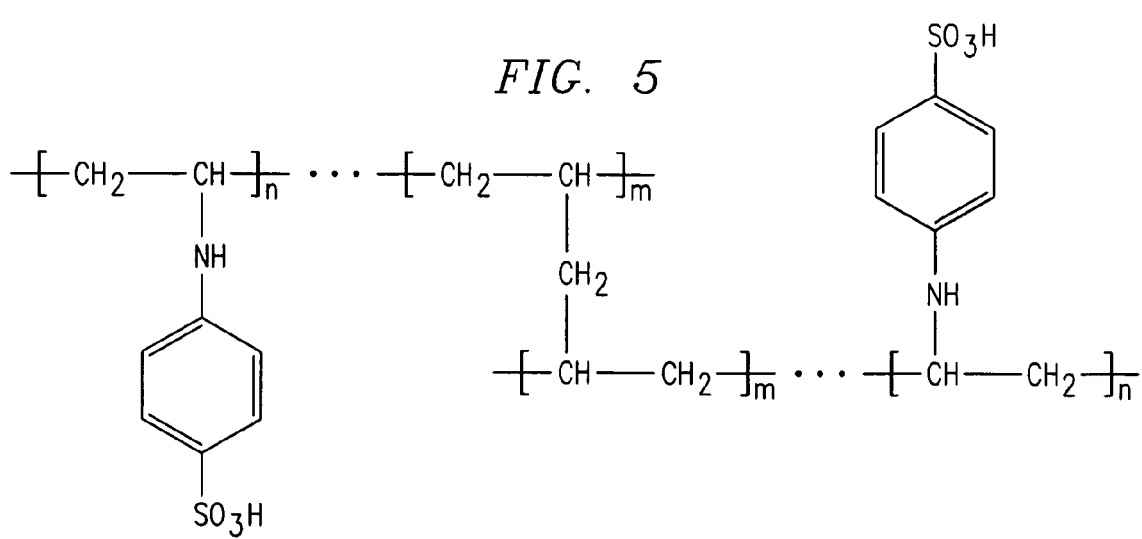
FIG. 5.

Another cation exchange membrane of the present invention may be prepared using polyvinyl alcohol, PVA (preferrably, Mol. Wt.=1,25,000). The process involves bromination of the PVA using a 0.5 N bromine in acetic acid followed by sulfonation in 25% aqueous solution of sulfanylic acid for 6 hours. The sulfonated membrane may then be crosslinked, preferrably with formaldehyde in concentrated sulfuric acid for 30 minutes. This results in a cation exchange membrane as illustrated in FIG. 5 with desirable electrochemical and mechanical properties.

Production Process

The production process of the present invention involves the in situ polymerization of at least one polymer or copolymer on a woven PVC support membrane to form an ion exchange membrane. At least one polymer or copolymer should be capable of forming a polyelectrolyte during polymerization and/or upon subsequent treatment of the membrane to chemically alter unreacted groups of the polymer. The process additionally includes crosslinking. The crosslinking may be accomplished in a single step by adding crosslinking agents before polymerization or as a second step by application of the crosslinking agents to the polymerized membrane or subjecting of the polymerized membrane to conditions that induce crosslinking. This process represents a novel method of forming ion exchange membranes and also achieves several advantages over the previous processes in terms of lower cost and reduction in the use of hazardous chemicals.

Many efficiencies in the ion exchange membrane production process of the present invention result from the use of a woven support membrane, such as polyvinyl chloride (PVC) and the process of in situ polymerization on the woven membrane. Woven PVC membranes are the preferred support membranes. PVC produces excellent ion exchange membranes when polymerized because the PVC provides continuous micropores through which ions smaller than the pore size can be selectively permeated. The use of PVC membranes also results in a production cost reduction and environmental benefits because the manufacturing process uses less hazardous materials. Specifically, the use of carcinogenic chloromethylether is avoided in the production process of this embodiment of the invention. Additionally, unlike radiation grafting techniques, the present techniques for membrane production do not require high-energy radiation sources that can consume prohibitively expensive amounts of electrical power.

In a preferred embodiment of the ion exchange membrane production process of the present invention, a support membrane is coated with a polymerizing solution containing a polyelectrolyte, and ion exchange groups are subsequently introduced during and/or after polymerization.

More specifically, anion exchange membranes may be produced through a novel process by preparing a paste of 4-vinylpyridine polymer or copolymer and the aliphatic epichlorohydrin monomer in the presence of aniline and a catalyst. The paste is applied to a woven fabric membrane such as a PVC membrane and then heated to a high temperature. After polymerization, the polymer is washed and further quaternized with methyl iodide to produce the ion exchange membrane. See FIGS. 6 and 7.

Epichlorohydrin is used in this process along with 4-vinylpyridine and aliline because of its superior chemical stability and crosslinkability. In the process, epichlorohydrin and aniline both act as crosslinking agents. Quaternization is accomplished using methyl iodide in a hexane solvent. The crosliniking reaction may be successfully completed by using mixture of 1:1:0.5 in the molar ratio of 4-vinylpyridine:epichlorohydrin:aniline. Similarly, mixture ratios 1:0.5:0.25 and 1:0.1:0.05 may also be used. This procedure yields polymers with hydroxy-terminated groups to increase the swelling of the membranes and thus increase the transport properties. Using this method, the number of exchangeable groups is increased for the better efficiency of the membrane due to increased flux.

The treatment of the membrane with an auxiliary quaternizing agent, used only to quaternize the unreacted tertiary amino monomers in the polymer, is effected by simply soaking the membrane in a saturated solution of the quaternizing agent in hexane or another such similar solvent. In a preferred embodiment, methyl iodide is the quaternizing agent.

One process of the present invention is the two-step procedure as follows. 4-Vinylpyridine is homopolymerized with simultaneous crosslinking and quaternizing by addition of epichlorohydrin and aniline. The reaction is carried out in a hot air oven on a PVC woven fabric support membrane at 80° C. In the second step, unreacted pyridine units of poly(4-vinylpyridine) are quaternized in hexane containing methyl iodide to give a strongly alkaline anion exchange membrane. Variations in the process parameters such as temperature, reaction time, extent of crosslinking and water content are likely to affect the quality of the membrane.

Optimum water content is critical for a high quality membrane. In the present invention, the higher the crosslinking, the lower the water content. Thus a membrane with low levels of crosslinked polymer will have higher water content. The number of ion exhangeable groups is also an important factor in membrane quality. Longer reaction times will increase the substitution of ion exchangeable groups. An increase in reaction temperature up to 80° C. will also increase the introduction of ion exchangeable groups, thereby increasing the electrochemical properties of the membranes. However, the durability of the membranes depends upon the environmantal conditions such scaling etc. All these factors were considered during the synthesis of the membranes. One skilled in the art, based upon prior knowledge and the description provided above should easily determine the set of reaction parameters required to produce a membrane with any specifically desired qualities.

In two other related processes, anion exchange membranes may be produced by two different methods. In the first method, membranes are prepared by dissolving poly(4-vinylpyridine) in ethyl alcohol and adding this solution to an epichlorohydrin and aniline mixture in relative amounts depending upon the extent of crosslinking to be achieved (greater crosslinking is observed if more epichlorohydrin and aniline mixture is present). The resulting mixture is pasted onto woven PVC support and dried at room temperature. The ion exchange membrane thus obtained is washed with diethyl ether and further quaternized with methyl iodide.

In order to avoid direct polymerization of 4-vinylpyridine, a second method may be used in which simultaneous polymerization and crosslinking are achieved. This differs from the first process described above because in the second method the polymerization step is avoided. A reduction in one step of the process may be economical commercially. In this method, membranes are produced by applying a mixture of monomer, an initiator, and crosslinking agent onto woven PVC support, then heating the mixture to 80° C. in a oven for 12 hours. The resulting membrane is then washed with diethyl ether to remove the unreacted monomers, dried at room temperature, then dipped in a mixture of hexane and methyl iodide for about 12 hours to achieve quaternization. The process may be optimized so that the number of ion exchangeable groups increases due to an increase in the number of reactive groups per gram of polymer. This was possible due to the fact that quaternization of aniline can take place. In order to avoid evaporation of the monomer, the film may be simply covered with polyester sheets and pressed between iron plates.

For large-scale production, the second method may be more desirable than the first because it consists of only one step. Thus, the second process is less expensive than the first and its membranes may be easier to fabricate in production-run quantities.

Figure 7:
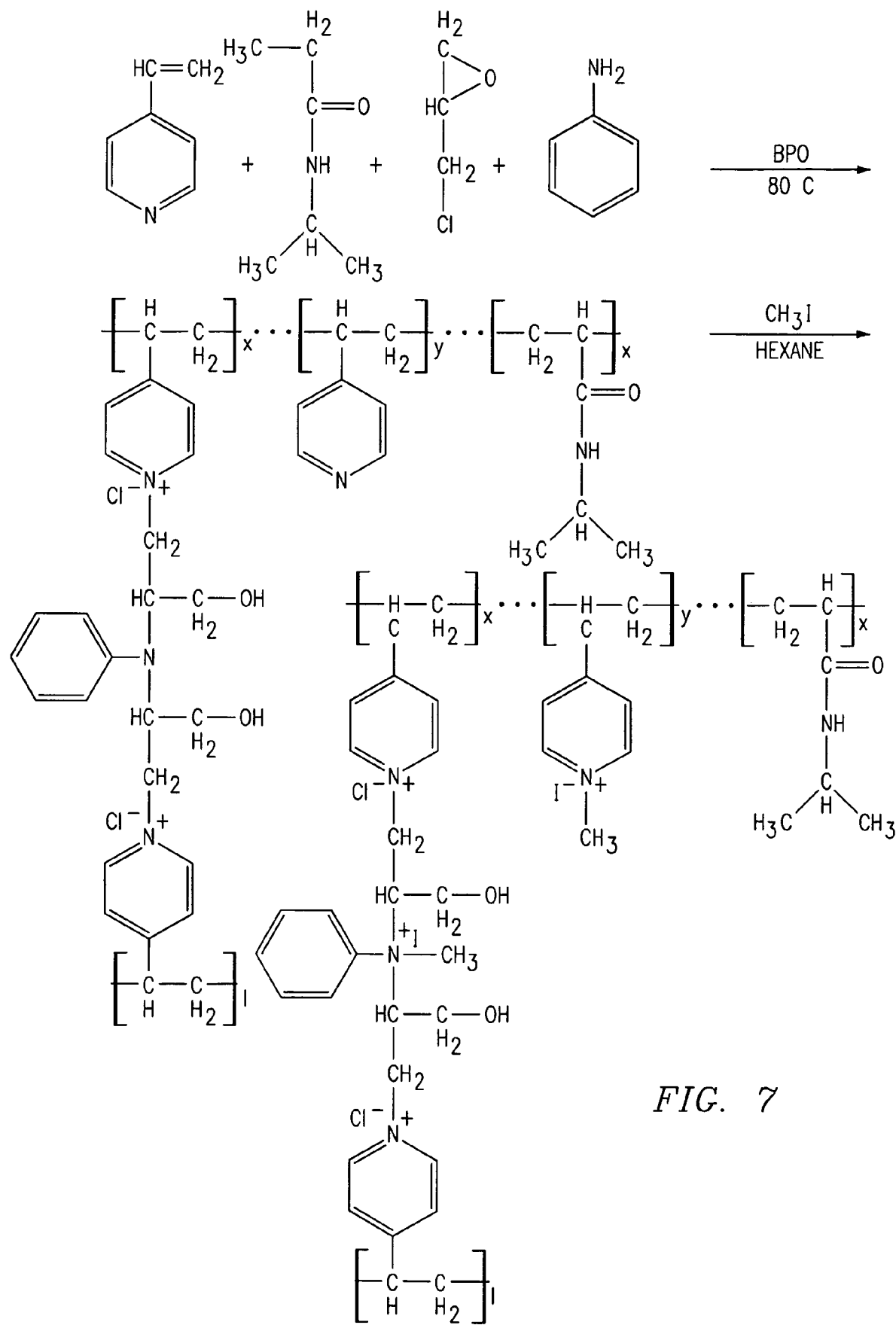
FIG. 7.

An anion exchange membrane formed from 4-vinylpyridine and an N-isopropylacrylamide copolymer may also be produced using a similar process as illustrated in FIG. 7. Variations of such a process similar to those described above in order to achieve similar objectives will be undestood by one skilled in the art.

In another preferred embodiment, a cation exchange membrane was prepared by copolymerization of N,N'-diallylaniline with maleimide derivative. The polymer obtained was precipitated in a nonsolvent (methanol, acetone or ethanol). Next, it was dissolved in a minimum amount of organic solvent (chloroform or benzene) so as to obtain a pasty mass, which was pasted on a woven PVC membrane. The polymer formed was further crosslinked by thermal curing in order to increase the mechanical strength and chemical stability. The membrane thus obtained was subjected to sulfonation using chlorosulfonic acid in dichloromethane, thereby increasing the number of ion exchange groups present. See FIG. 8 for an illustration of this process.

A second novel cation exchange membrane was prepared by brominating polyvinyl alcohol using the brominating mixture (i.e., 0.5 N bromine in acetic acid). The brominated membrane was treated with 25% solution of sulfanylic acid in water in order to introduce the sulfonic acid groups. Then the membrane was treated with formaldehyde in concentrated sulfuric acid to crosslink it. See FIG. 9 for a depiction of this process. Membrane formation was confirmed by the FTIR data and the membrane was tested for its ion exchange properties. Ion exchange capacity is 2-2.5 meq of sodium/g of the membrane. The swelling of the membrane in water is about 25 to 30% (a favorable condition for electrodialysis process). The resistance of the membrane is 3-4 ohm $cm^2$. All these properties are better than most of the presently used commercial membranes.

Processes Utilizing Ion Exchange Membranes

The present invention not only encompasses ion exchange membranes and processes for their production, but also methods of using such membranes. One group of such methods is water desalination through electrodialysis. Electrodialysis may be used for purification or remediation of water containing sewage or similar contaminants, purification or remediation of industrial discharges, including discharges from mining, tannery, and other extractive industries which may contain either organic or inorganic chemicals, compounds, or mixtures, purification or remediation of irrigation water from return flows, or purification or remediation of water from whatever source containing toxic substances from either natural or human deposition. All such purification or remediation may be to safety levels prescribed by any relevant regulatory authority. Similarly, the ion exchange membranes of the present invention may be used for desalination of seawater, surface water or groundwater containing saline, or surface water or groundwater containing other minerals in solution or suspension to safety levels prescribed by any relevant regulatory authority.

The ion exchange membranes may also have applications in the recovery of solids. They may be used for the removal of solid materials from wastes containing solid, gaseous, or liquid suspension for industrial or military purposes, e.g. recovery of silicates or other precious materials as well as removal of organics to be used in the production and fabrication of semiconductors and other electronic devices common to the telecommunication, computer, and other related industries, including products using nanotechnology. The membranes may also be used for the recovery of inorganic materials whether in solid, or liquid suspension for research and development or production of pharmaceuticals or other products for activities related to biotechnology and food industries. Finally, the ion exchange membranes may also be used for recovery of specific mineral elements from the above described processes for further economic employment, whether such recovery is intended to be primary or secondary in nature, as allowed by appropriate regulatory authority.

Figure 10:
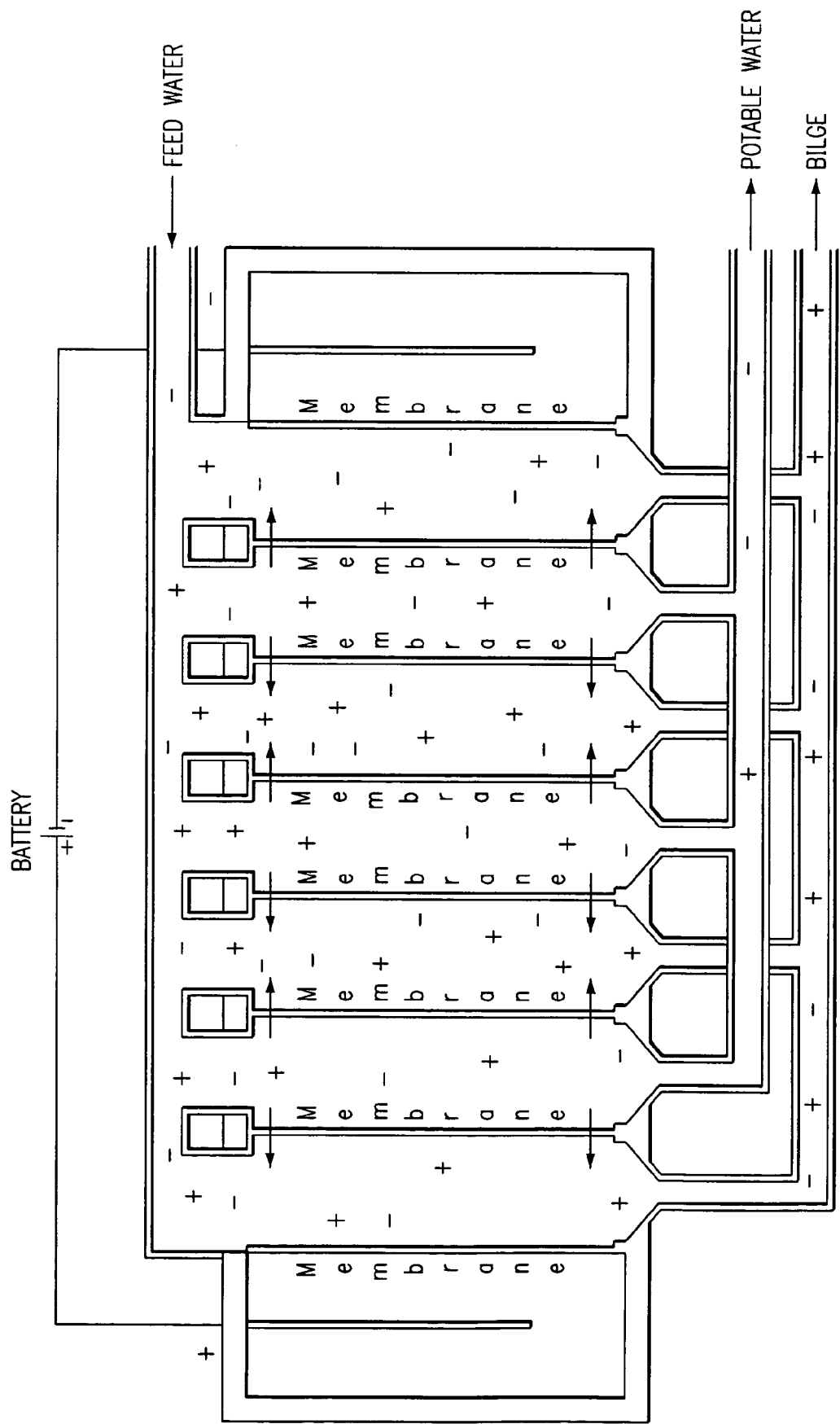
FIG. 10.

Electrodialysis in the present invention may be accomplished using ion selective membranes and the application of an electric field orthogonal to the membranes. See FIG. 10. The anion and cation selective membranes are placed alternatively between the anode and cathode. This results in the concentration or dilution of the solution in neighboring compartments, leading to high water purity in alternating compartments. The cost of the process may be reduced by using the largest membrane surface area possible. Thus, electrodialysis is quite effective in the deionization of waste/effluent from industrial sources. Electrodialysis can concentrate an electrolyte to high levels, resulting in high water recycling ratios and a small waste stream to dispose off. The electrodialysis process of the present invention, unlike previous processes, may also be used to deionize highly acidic solutions because the membranes of the present investigation are resistant to highly acidic environments.

One water purification method of the present invention may be used in the desalination of brackish water or seawater and treatment of seawater to recover salt. In this method, an electrical potential gradient is applied across an ion exchange membrane of the present invention in order to separate the salt or other ions such as poisonous arsenic and fluoride from water. Unlike previous methods, in the method of the present invention, water is not pretreated with ion exchange columns to remove the excessive salt content. It may be passed through the ion exchange membrane stack module without any pretreatment because the superior qualities of the membranes of the present invention allow them to withstand solutions with high ion content and to effectively remove such concentrated ions to produce water meeting the World Health Organization impurity limit or other desirable purity limits.

Alternate starting water for the above process may be water from industrial effluents, such as a waste water from the chemical, food processing, semiconductor and metal processing or tannery industries. Even industrial effluents should not require pretreatment to obtain water of acceptable purity. However, pretreatment of some extremely concentrated solutions, such as extremely hard water may be advisable even when using the membranes of the present invention. Even if pretreatment is included, the process of the present invention will still represent cost savings over previous methods because the ion concentration need not be lowered as much during pretreatment.

Although only preferred embodiments of the invention are specifically described above and in the following examples, it will be appreciated that modifications and variations of the invention are possible without departing from the spirit and intended scope of the invention.

EXAMPLES

Example 1

Preparation of Anion Exchange Membrane Using 4-Vinylpyridine Crosslinked with Epichlorohydrin and Aniline One gram of 4-vinylpyridine was dissolved in 10 ml of ethyl alcohol and the mixture was polymerized in the presence of a benzyl peroxide initiator (2 weight % relative to the vinyl monomer) for 6 hours at 80° C. in a 100 ml round bottom flask. The polymer formed in solution was precipitated by the addition of 50 ml of water. The white colored solid polymer was separated by filtration and washed repeatedly with distilled water to remove the low molecular weight polymers. About 4 g of polymer was dissolved in 1000 ml of ethyl alcohol and to this solution, epichlorohydrin and aniline were added as crosslinking agents. The resulting mixture was poured onto woven PVC membrane and the process of crosslinking was continued up to 12 hours at room temperature.

Subsequently, the PVC fabric with polymer was sandwiched between plastic lined glass plates and heated to 80° C. for periods up to 12 hours to form the crosslinked polymer membrane having quaternary ammonium groups and reinforced with PVC support. These membranes exhibited excellent mechanical properties (Muller burst strength of 4-5 kgf/cm$^2$) and, in particular, excellent resistance to aggressive chemicals were obtained. The unreacted pyridine units were quaternized using methyl iodide by placing the membrane in a mixture of hexane:methyl iodide in the molar ratio of 6:4 at room temperature for 12 hours. The alkylated membrane was washed with diethyl ether to remove any residual methyl iodide and the membrane was dried under vacuum for 2 hours.

The membrane thus produced exhibited electrical resistance of between 1.5 and 3.0 ohm cm$^2$ as measured after attainment of equilibration at 25° C. in 0.5 N sodium chloride solution. The instrument used for this measurement was an APLAB Autocompute LCR-Sortester (Model 4912, Ser. No. 981/1 made in Mumbai) at the frequency of 1 kHz using AC. The transport number was found to be >0.98 as measured by electrodialysis of 0.5 N sodium chloride solution at the current density of 20 mA/cm$^2$. An indigeneously built chronopotentiometry was also used to measure the transport number. The ion exchange capacity in milliequivalents/g of chloride ions from the dry membrane was found to be between 2.5 and 3.5. This is the useful range of values for any commercial membrane for the intended application of this embodiment. The thickness of the membranes as measured by micrometer screw gauge was between 0.14 and 0.16 mm. Water content (wet mass/g of chloride ion from dry membrane) i.e., equlibrium swelling was 15-20%. These data were obtained after attainment of equilibrium swelling of the membranes that are immersed in distilled water and also in 0.1 N sodium chloride solution. The wet mass was measured after equilibrium with 0.1 N sodium chloride solution.

The membrane thus obtained was characterized by FTIR. The peak observed at wavenumber 3406 cm$^{-1}$ is due to N—H and O—H bond indicating the reaction between epichlorohydrin and aniline. It also indicates the presence an unreacted N—H group of aniline. The peak at 1597 cm$^{-1}$ is due to the N—H asymmetric bending of aniline. The peak at 1424 cm$^{-1}$ is due to the O—H bending of the epichlorohydrin indicating its ring opening for crosslinking. The C—N stretching frequencies appearing at 1504 cm$^{-1}$ indicates the reaction between aniline and epichlorohydrin.

Figure 6:
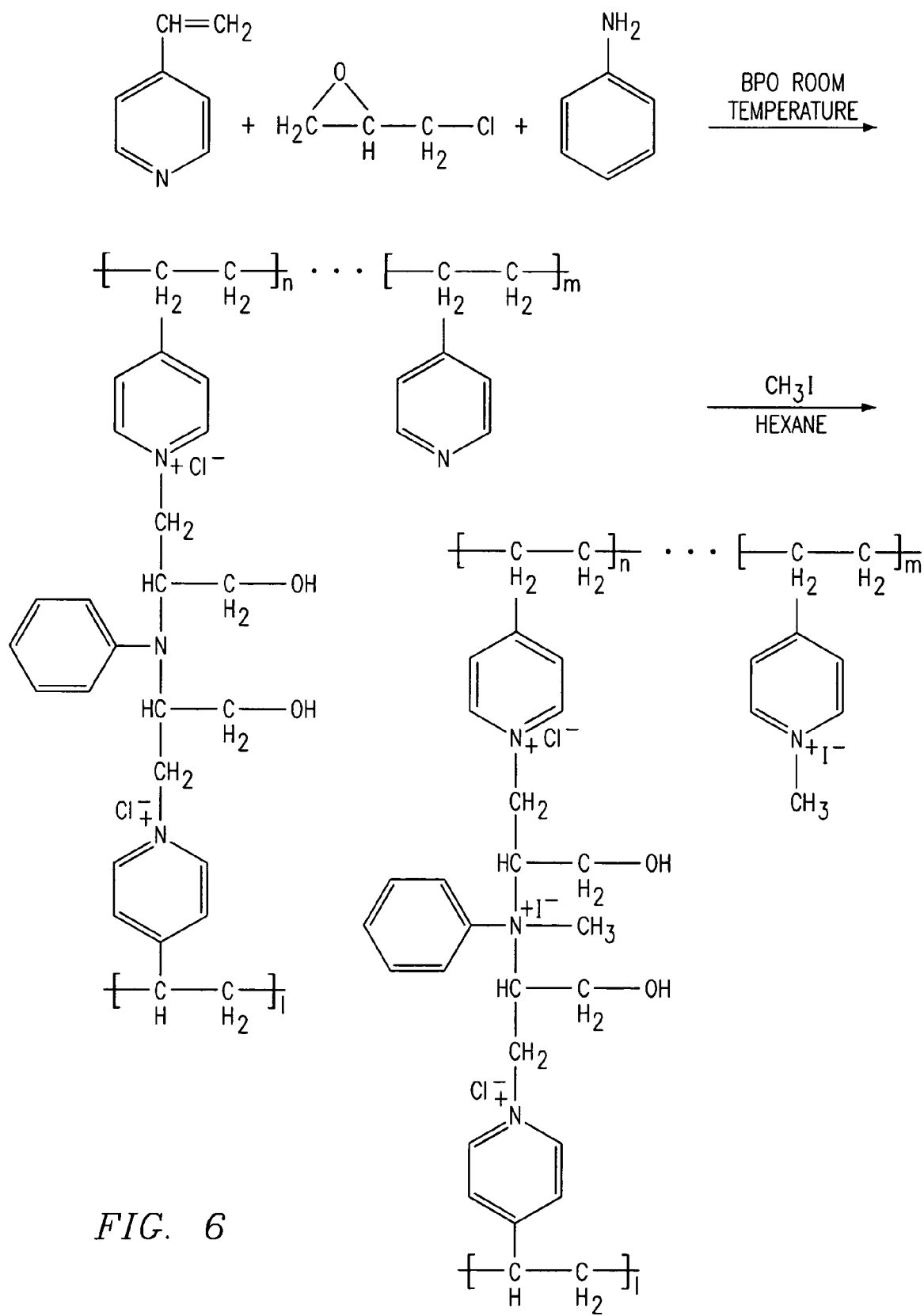
FIG. 6.

Thus, during polymerization by this method, the nitrogen group of the vinyl pyridine monomer couples directly with the alkyl group of the epichlorohydrin to from the quaternary ammonium chloride groups. The tertiary amine vinyl monomers of the polymer attach themselves covalently to the chain in this reaction forming part of the polymer backbone as shown in FIG. 6.

Further reaction of the coupled crosslinked polymer when treated with hexane saturated methyl iodide quaternizes the tertiary amino group as shown above. The thus-formed three-dimensional matrix structure is sufficient to ensure that the membrane is insoluble in water without causing the membrane to loose its flexibility. Depending upon the degree of crosslinking during its synthesis, the membrane will naturally absorb a fixed quantity of water and become totally ionically conductive when equilibrated in water.

In other embodiments, suitable aliphatic vinyl monomers or comonomers comprising covalently bonded tertiary amine groups are: tertiary substituted acrylamides, methylacrylate esters, methacrylamides, acrylate, esters or alkyl-substituted tertiary amine groups (Chem. Commun., 1303-1304 (1998)).

The membranes of this invention can be obtained by the process of casting solutions or pastes of the polymer or of the mixtures of polymers in miscible common solvents or in liquid comonomers, which are used to couple onto the woven PVC membrane. Here, the solutions of desired polymers or copolymers are usually prepared by dissolving each of the polymers in a common solvent, followed by heat polymerization with the added catalyst. The quaternization and polymerization generally take place simultaneously. The membrane obtained is then treated with alkyl halide. The preferred alkylating agent is methyl iodide. However, other alkylating agents like methyl, ethyl, or propyl in the form of chloride, iodide or bromide may also be used.

Example 2

Preparation of Anion Exchange Membrane Using N-Isopropylacrylamide and 4-Vinylpyridine The anion exchange membrane was prepared by copolymerizing 4-vinylpyridine and N-isopropylacrylamide using benzyl peroxide as an initiator. The 4-vinylpyridine and N-isopropylacrylamide (1 weight % to the vinyl monomer), aniline and epichlorohydrin and the initiator were mixed in a 100 ml beaker. The resulting mixture was pasted onto woven PVC material and polymerized at 80° C. for 12 hours in an inert atmosphere. The polymer formed was washed with diethylether to remove unreacted monomers. It was further quaternized with methyl iodide in hexane as a solvent for 12 hours at room temperature. See FIG. 7. The polymer structure was confirmed as characterized by FTIR.

Example 3

Preparation of N,N'-Diallylaniline-Based Cation Exchange Membranes

Figure 8:
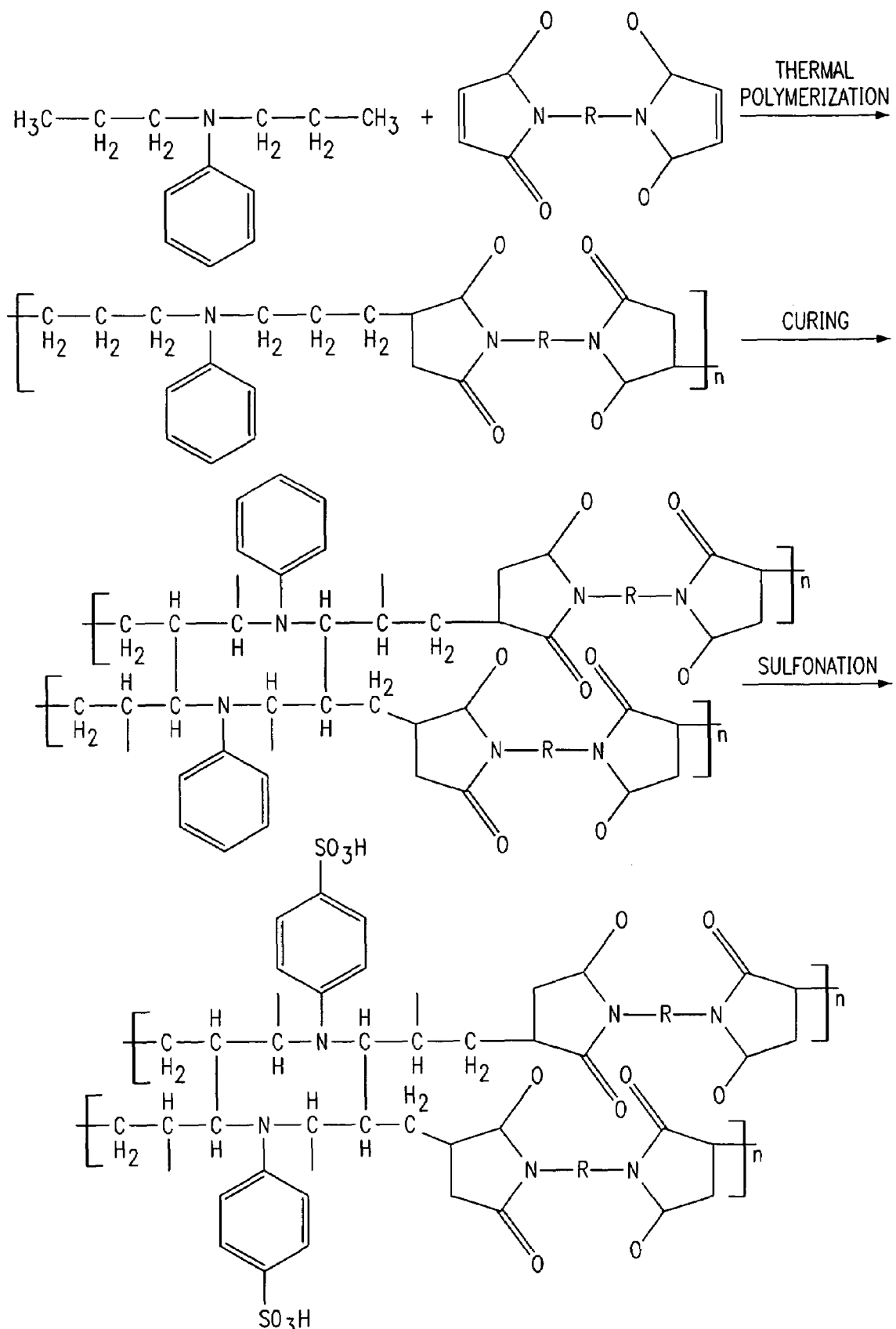
FIG. 8.

One of the cation exchange membranes of the present invention was prepared by copolymerization of N,N'-diallylaniline with maleimide derivative in an inert atmosphere at 80° C. for 12 hours. The polymer obtained was precipitated in a nonsolvent (methanol, acetone or ethanol). Next, it was dissolved in a minimum amount of organic solvent (chloroform or benzene) so as to obtain a pasty mass, which was then pasted on a woven PVC membrane. The polymer formed was further crosslinked by thermal curing at 120° C. for 12 hours in an inert atmosphere in order to increase the mechanical strength and chemical stability. The membrane thus obtained was subjected to sulfonation using chlorosulfonic acid in dichloromethane. The reaction scheme is shown in FIG. 8.

Example 4

Preparation of Cation Exchange Membrane Based on Polyvinyl Alcohol Followed by Sulfonation with Sulfanylic Acid A second novel cation exchange membrane was prepared by brominating polyvinyl alcohol in a brominating mixture (i.e., 0.5 N bromine in acetic acid). This was treated with 25% solution of sulfanylic acid in water to introduce sulfonic acid groups. The membrane was treated with formaldehyde in concentrated sulfuric acid to obtain a crosslinked membrane. This membrane was prepared without the use of any support PVC membrane. The membrane formation was confirmed by FTIR and tested for its ion exchange capacity. See FIG. 9. Ion exchange capacity of this membrane is 2-2.5 meq of sodium/g of the membrane. The swelling of the membrane in water is in the range 25-30% (a favorable condition for electrodialysis membrane). The resistance of the membrane is 3-4 ohm cm$^2$.

Figure 9:
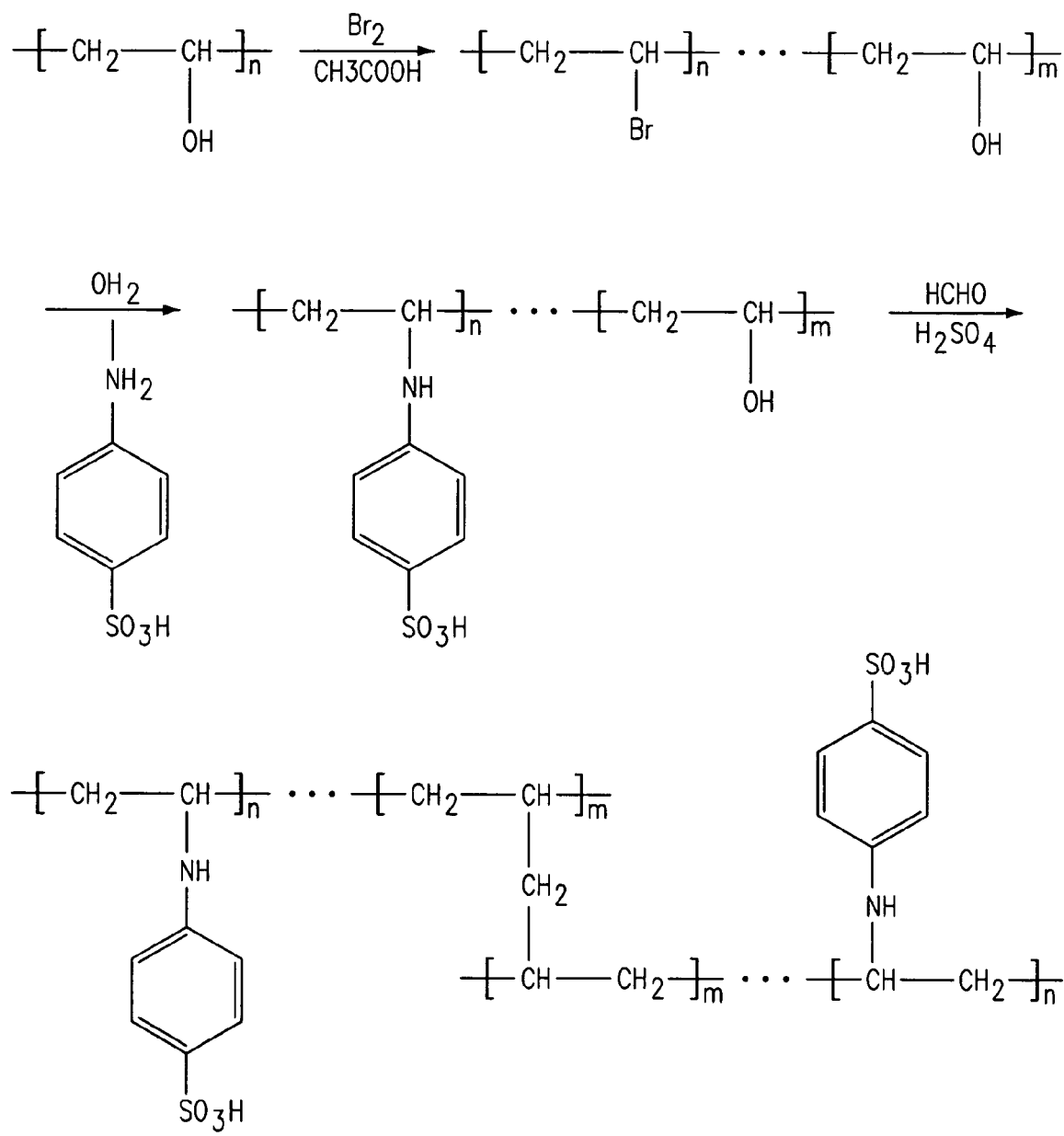
FIG. 9.

The FTIR data of the membranes indicate that the reaction scheme provided in FIG. 9 is acceptable. For example, the peak at 3061 cm$^{-1}$ is due to the O—H and N—H streching vibrations of polyvinyl alcohol and sulfanylic acid. The peaks at 1601 and 838 cm$^{-1}$ are attributed to the N—H deformation as well as wagging of the sulfanylic acid, respectively. However, the peak at 1011 cm$^{-1}$ is due to the S=O streching of the sulfanylic acid.

Example 5

Desalination of Brackish Water or Seawater Using Anion and Cation Exchange Membranes Brackish water or seawater which may or may not be chlorine-dosed is provided through a feed pipe to an electrodialysis unit. The water is obtained from a borewell or intake pipe and may pass through a chlorine-dosing or other treatment station, but no pretreatment designed solely to remove excess ions occurs.

The electrodialysis unit is 600 mm×1,100 mm×800 mm and houses at approximately 120 pairs (or more depending upon the type of water) of alternating cation and anion exchange membranes which measure 500 mm×1,000 mm each and are separated by 880 mm×380 mm spacers. Each membrane is sealed to the edges of the membrane region of the electrodialysis unit by a 500 mm×1,000 mm gasket around its perimeter. The entire unit is placed securely within the sturdy walls of the polyvinyl chloride sheets. This prevents leakage of water around rather than filtration through the membrane. An 880×380 mm precious metal titanium anode is located at one end of the membrane stack while a stainless steel cathode of the same size is located at the opposite end of the membrane stack. The general configuration of the electrodialysis unit not drawn to scale and showing only a few representative membrane pairs may be seen in FIG. 10.

Power is supplied to the anode and cathode using a 230 volt D.C. power supply with 15 amps capacity. Two pumps of 0.5 HP capacity are used to circulate feed water into the unit and to remove and/or recirculate the concentrated wastewater from alternating spaces between membranes. One pump of 0.25 HP capacity is used to remove and/or recirculate the purified water. Water flow into the electrodialysis unit is indiated and controlled using a rotameter which includes a solenoid valve, ball valves, a pipe line and a panel board.

The invention claimed is:

1. A homogenous cation exchange membrane prepared using a method comprising:
   brominating a polyvinyl alcohol;
   treating the polyvinyl alcohol with an acid to induce sulfonic acid groups;
   forming a membrane; and
   crosslinking the membrane using a formaldehyde solution to create a homogenous cation exchange membrane, wherein the membrane comprises a compound having the following formula:

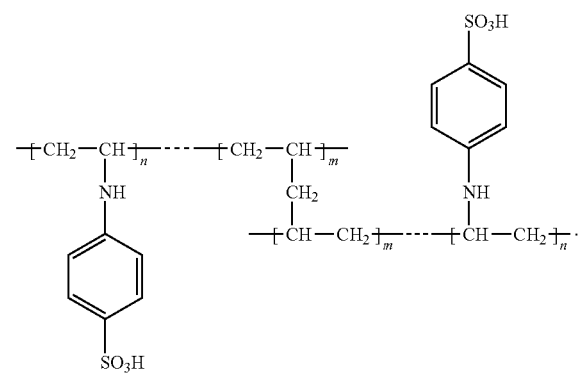

2. The membrane of 1, wherein the acid comprises sulfanylic acid.

3. The process of claim 2 wherein the sulfanylic acid further comprises a 25% solution of sulfanylic acid.

4. A cation exchange membrane comprising a compound having a formula of:

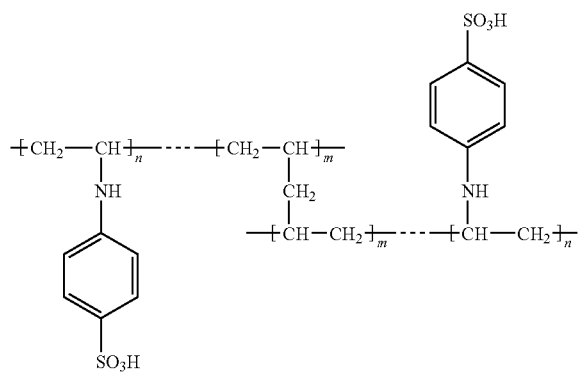

wherein the membrane is homogenous.

5. The membrane of claim 4, wherein the membrane has an ion exchange capacity of 2 to 2.5 meq of sodium/g.

6. The membrane of claim 4, wherein the membrane swells between about 25 to 30% in water.

7. The membrane of claim 4, wherein the membrane has a resistance of approximately 3 to 4 ohm cm$^2$.

8. A process for electrodialysis comprising:
   passing a solution comprising ions to be removed through a membrane stack having at least one cation exchange membrane prepared using a method including:
   brominating a polyvinyl alcohol;
   treating the polyvinyl alcohol with an acid to induce sulfonic acid groups;
   forming a membrane; and
   crosslinking the membrane using a formaldehyde solution to from a homogenous cation exchange membrane;
   applying a current orthogonal to membrane surfaces while passing the solution through the membrane stack; and
   withdrawing purified or concentrated solution from alternating compartments of the membrane stack, wherein the cation exchange membrane further comprises a compound having the following formula:

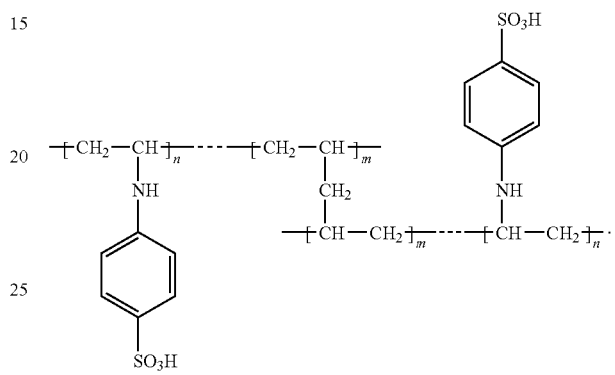

* * * * *

UNITED STATES PATENT AND TRADEMARK OFFICE
CERTIFICATE OF CORRECTION

PATENT NO. : 7,544,278 B2  Page 1 of 1
APPLICATION NO. : 10/827397
DATED : June 9, 2009
INVENTOR(S) : Tejraj Aminabhavi, Padmakar V. Kulkarni and Mahadeva Y. Kariduraganavar It is certified that error appears in the above-identified patent and that said Letters Patent is hereby corrected as shown below:

Col. 1, line 17
Replace "cation exhange membranes" with --cation exchange membranes--

Col. 10, line 25
Replace "and aliline because" with --and aniline because--

Col. 10, lines 65-66
Replace "the environmantal conditions such scaling etc." with --the environmental conditions such as scaling etc.--

Col. 16, line 17
Replace "An 880x380 mm" with --An 880 mmx380 mm--

Col. 16, line 64
Replace "The membrane of 1," with --The membrane of claim 1,--

Col. 16, line 66
Replace "of claim 2 wherein" with --of claim 2, wherein--

Col. 18, line 4
Replace "forming a membrane; and" with --forming a membrane;--

Signed and Sealed this

Eighteenth Day of August, 2009

David J. Kappos
*Director of the United States Patent and Trademark Office*